UNITED STATES PATENT OFFICE.

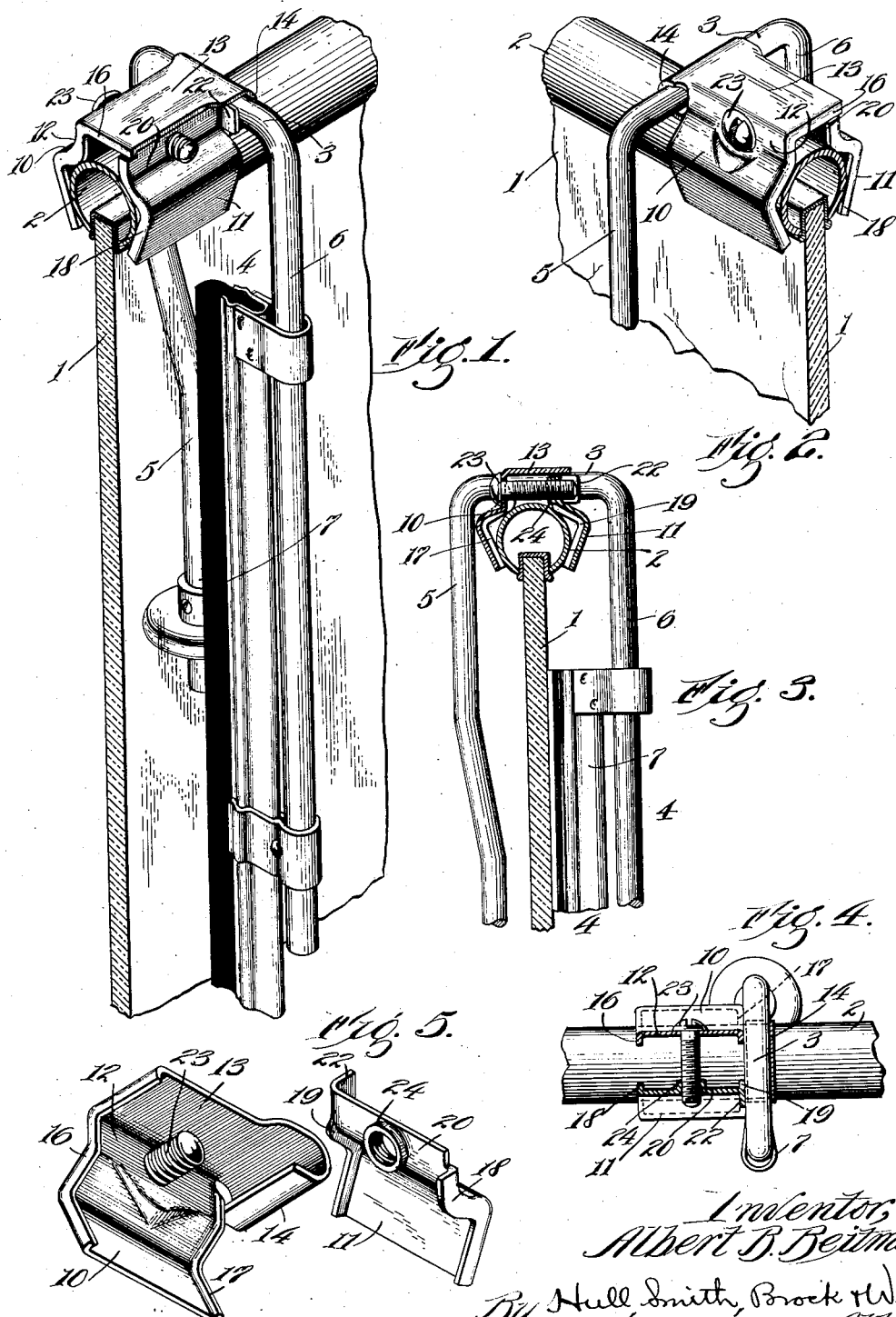

ALBERT B. BEITMAN, OF CLEVELAND, OHIO, ASSIGNOR TO THE OUTLOOK COMPANY, OF CLEVELAND, OHIO, A CORPORATION OF OHIO.

BRACKET FOR WINDSHIELD-CLEANERS.

1,347,201.

Specification of Letters Patent.

Patented July 20, 1920.

Application filed September 29, 1917. Serial No. 193,907.

*To all whom it may concern:*

Be it known that I, ALBERT B. BEITMAN, a citizen of the United States, residing at Cleveland, in the county of Cuyahoga and State of Ohio, have invented a certain new and useful Improvement in Brackets for Windshield-Cleaners, of which the following is a full, clear, and exact description, reference being had to the accompanying drawings.

This invention relates to windshield cleaners, and more particularly to an improved clamp bracket for attaching such cleaners to the frames of windshields.

The objects of the invention are to produce a clamp bracket adaptable to frames of different cross-sectional sizes and shapes; one that is comparatively small and compact, extending no farther above the frame, when applied to the upper side thereof, than is necessary to provide a bearing for the shaft of the cleaner, and consequently not interfering in any way with the automobile top fitting in proper relation to the windshield; to provide a device of this character that is smooth and free from exposed edges or corners that would be likely to wear or tear the top; and to economically construct a clamp bracket of the foregoing nature preferably of but two die stampings held together by a single screw and coöperating to provide an efficient bearing for the shaft.

More generally stated, the invention may be said to have for its object the production of a comparatively cheap and simple device that may be conveniently clamped to prevailing types of windshield frames, preferably by the use of a single screw, and that when so attached will constitute an efficient bearing for the shaft of the cleaning device and securely hold the same in proper relation to the windshield pane; and it may be said to consist of the combinations of elements illustrated in the drawing accompanying and forming a part hereof and set forth in the claims annexed hereto.

In the drawing, Figure 1 is a fragmentary perspective view of a windshield having a cleaning device attached thereto by the clamp bracket of my present invention; Fig. 2 is a view similar to Fig. 1, and taken from the other side of the windshield; Fig. 3 is a central vertical section through the bracket, showing the adjacent portions of the windshield, frame, and cleaning device; Fig. 4 is a horizontal section through the upper portion of the bracket in the plane of the shaft; and Fig. 5 is a perspective view of the various elements of the clamp bracket in separated condition.

Describing the invention by the use of reference characters, 1 represents the pane of a windshield having a frame 2 to which is clamped, by the use of my improved clamp bracket, a shaft 3 of a cleaning device represented generally at 4. In the present instance, this cleaning device comprises, besides the shaft 3, an operating arm 5 on the inner side and a branch 6 on the outer side of the pane, the operating handle and branch being shown as formed integral with the shaft 3; and to the branch 6 there is secured a squeegee 7 for wiping engagement with the outer surface of the pane.

The clamp bracket is made up of opposed plates 10 and 11, the frame engaging portions whereof are substantially identical and comprise angularly disposed portions which embrace the sides of the frame. Because of this angular relation of the portions of each plate, the plates are capable of fitting frames of different shapes, and by reason of their adjustability toward and from each other, as will be presently seen, they are capable of being clamped to frames of different cross-sectional sizes. The plate 10 has a portion 12 extending upward, and a further portion 13 continuing therefrom horizontally over the frame 2, and one end of the portion 13 is curved downwardly and inwardly to form a bearing 14 for the shaft 3. The entire end of the plate 10 remote from the shaft 3 is flanged, as indicated at 16, and at the opposite end the plate is treated likewise, as represented at 17, up to the top of the portion 12. Therefore, the flanged portion 17 within the zone of the portion 12 forms a flat bearing for the adjacent portion of the shaft. Both ends of the plate 11 are flanged one at 18 and the other at 19, the former terminating short of the upper edge of the plate, so as not to interfere with the flange 16 of the plate 10. A lug 22 is turned laterally from one end of the vertical portion 20 of the plate 11 to form a support for the shaft 3 along the open side of the former bearing 14. At substantially its longitudinal center, the portion 12 of the plate 10 is perforated for the passage of a screw 23 that is threaded through an inwardly turned boss 24 of the corresponding portion 20 of the plate 11. By means of this screw the clamping plates may be drawn toward each other into firm engagement with opposed sides of the frame; and, bearing as they do at opposite ends upon the frame, the plates are held firmly in proper relation to each other so that the portions constituting the bearing for the shaft 3 will automatically assume and maintain proper relative position.

Having thus described my invention, what I claim is:—

1. The combination of opposed plates for application to opposite sides of a windshield frame, each plate having angularly disposed portions and a portion thereabove that is substantially parallel to the corresponding portion of the other plate, a screw passing freely through one and threaded into the other of such parallel portions, one of said plates having an extension disposed substantially horizontally above the frame and formed to constitute an open sided bearing wherein the shaft of a cleaning device is adapted to be journaled, the other plate having a portion serving to complete the bearing on said open side.

2. The combination of opposed sheet metal plates for application to the opposite sides of a windshield frame, one of said plates having a flat unobstructed portion extending over the top of the frame and the other a part fitting solely beneath such portion, said flat portion having an end extension curled downwardly and inwardly to form a bearing part for the shaft of a cleaner, the curled over portion being designed to rest on the windshield frame, and means for holding said plates in clamping engagement with the frame.

3. The combination of opposed plates for application to opposite sides of a windshield frame, one of said plates having a portion extending up and over the frame and the other a part fitting beneath such portion, said portion being formed at one end for co-operation with the adjacent end of the aforesaid part to constitute therewith a bearing wherein the shaft of a cleaning device is adapted to be journaled, and means for holding said plates in clamping engagement with the frame.

4. The combination of opposed plates for application to opposite sides of a windshield frame, and means for holding said plates in clamping engagement with the frame, one plate having an extension arranged to repose substantially horizontally above the frame and turned downwardly and inwardly at one end to constitute an open sided bearing, the other plate having a portion fitting beneath the extension and a laterally turned portion constituting a wall for the open side of the bearing.

5. The combination of plates for application to opposed sides of a windshield frame, means for clamping said plates to the frame, one of said plates having a portion arranged to be disposed horizontally above the frame, said portion being curved downward and inward at one end, a portion of the plate adjacent said curved portion being turned laterally, and a portion of the other plate being also turned laterally, the lateral portions of said plates and the aforesaid downwardly and inwardly turned portion constituting a bearing adapted to receive the shaft of a cleaning device.

In testimony whereof I hereunto affix my signature.

ALBERT B. BEITMAN.